No. 748,027. PATENTED DEC. 29, 1903.
W. C. SWIFT.
LOCK NUT.
APPLICATION FILED JUNE 1, 1903.
NO MODEL.
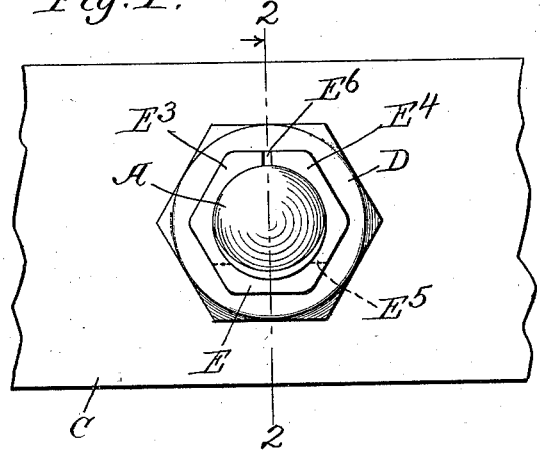
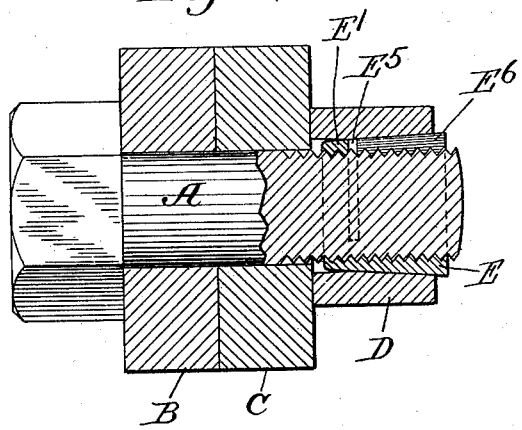
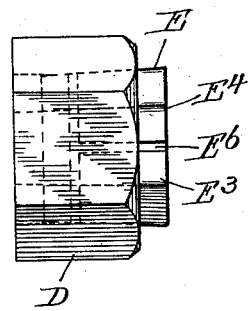
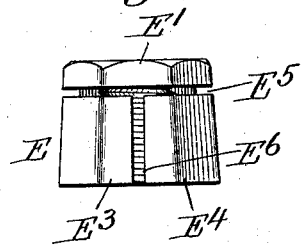
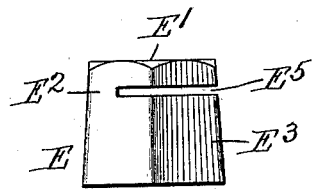
Witnesses.
Edward T. Wray
Homer L. Kraft
Inventor.
Willis C. Swift
by Parker & Carter
Attorneys No. 748,027. Patented December 29, 1903.

UNITED STATES PATENT OFFICE.

WILLIS C. SWIFT, OF CHICAGO, ILLINOIS.

LOCK-NUT.

SPECIFICATION forming part of Letters Patent No. 748,027, dated December 29, 1903.

Application filed June 1, 1903. Serial No. 159,541. (No model.)

*To all whom it may concern:*

Be it known that I, WILLIS C. SWIFT, a citizen of the United States, residing at Chicago, in the county of Cook and State of Illinois, have invented certain new and useful Improvements in Lock-Nuts, of which the following is a specification.

My invention relates to lock-nuts, and has for its object to provide a new and improved device of this description.

My invention is illustrated in the accompanying drawings, wherein—

Figure 1 is an end view of a bolt provided with a nut embodying my invention. Fig. 2 is a section on line 2 2, Fig. 1. Fig. 3 is a side view of the nut. Fig. 4 is a plan view of the inner part of the nut. Fig. 5 is a side view of Fig. 4.

Like letters refer to like parts throughout the several figures.

I have illustrated in the drawings one form of device embodying my invention and have shown the lock-nut in connection with an ordinary bolt A, passing through the parts B and C, which represents the devices in connection with which the bolt is used. On the threaded end of the bolt is an outer unthreaded part D and an inner threaded part E. The part D is provided with a non-circular opening, and at least a portion of the inner face of said part is beveled or inclined. The part E is provided with an exterior corresponding to the interior face of the part D. The inner part E is provided at its inner and smaller end with a continuous ring E'. This ring has a projecting part or standard $E^2$, to which are flexibly connected the two wings $E^3$ and $E^4$. The wings $E^3$ and $E^4$ are separated from the ring by the space $E^5$ and from each other by the space $E^6$. The parts may be arranged or formed in any desired manner. If, for example, the device is made for malleable material or wrought-iron, the projecting part or standard $E^2$ may be integral with the ring E'. As herein shown, the inner part E is tapered from its outer end toward its inner end, and the ring E' is made, preferably, of the same exterior diameter as the interior diameter of the outer part at its inner or smaller end, so that said ring simply acts as a guide to keep the outer part true and insure the proper alinement and engagement with the bolt.

When the device is used, the part E is placed within the part D. The part D is then rotated, carrying with it the part E. When the part D strikes a suitable stop—as, for example, the face of the part C—a continued rotation thereof forces the part E inwardly and compresses the wings $E^3$ and $E^4$, so as to cause them to clamp the threads of the bolt, thus locking the nut in position.

I claim—

1. A lock-nut, comprising an outer unthreaded part, an inner threaded part, the two parts connected so as to rotate together, said inner part provided with a ring having a projecting standard, two wings hinged or flexibly connected with said standard, and means for compressing said wings so that the threads thereon clamp the threads of the bolt when the parts are in their locking position.

2. A lock-nut, comprising an outer unthreaded part, having a non-circular opening, at least a portion of the face thereof being beveled or inclined, an inner threaded part having an exterior shaped to correspond with the inner face of the outer part, said inner part provided at its inner end with a continuous ring, a projecting standard integral therewith, and two wings hinged or flexibly connected with said standard and adapted to be compressed so that the threads thereon clamp the threads of the bolt when the inner part is forced into the outer part.

3. A lock-nut, comprising an outer unthreaded part, having an inner non-circular engaging face, at least a portion of which is inclined or beveled, an inner threaded part having a continuous ring, provided with a projecting standard, two wings hinged or flexibly connected to said standard and shaped exteriorly to correspond with the inner engaging face of the outer part, so that when the inner part is forced into the outer part the wings will be compressed to clamp the threads of the bolt, said ring on the inner part having a diameter substantially the same as the smallest inner diameter of the outer part, so as to act as a guide for the inner part.

WILLIS C. SWIFT.

Witnesses:
HOMER L. KRAFT,
FANNY B. FAY.